March 22, 1932. R. H. ERNY 1,850,833
ROTARY INTERNAL COMBUSTION ENGINE
Filed Aug. 5, 1927 5 Sheets-Sheet 3
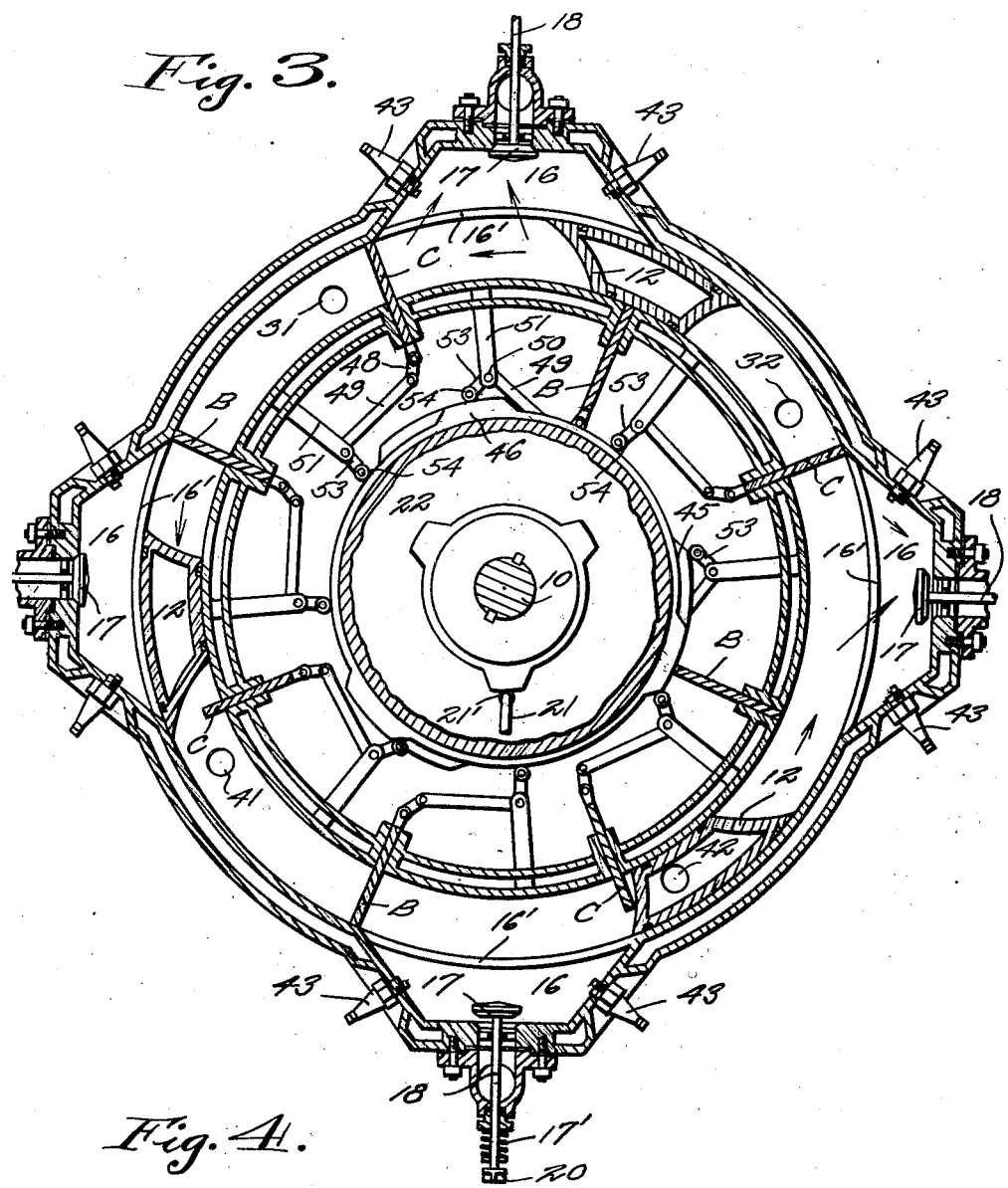

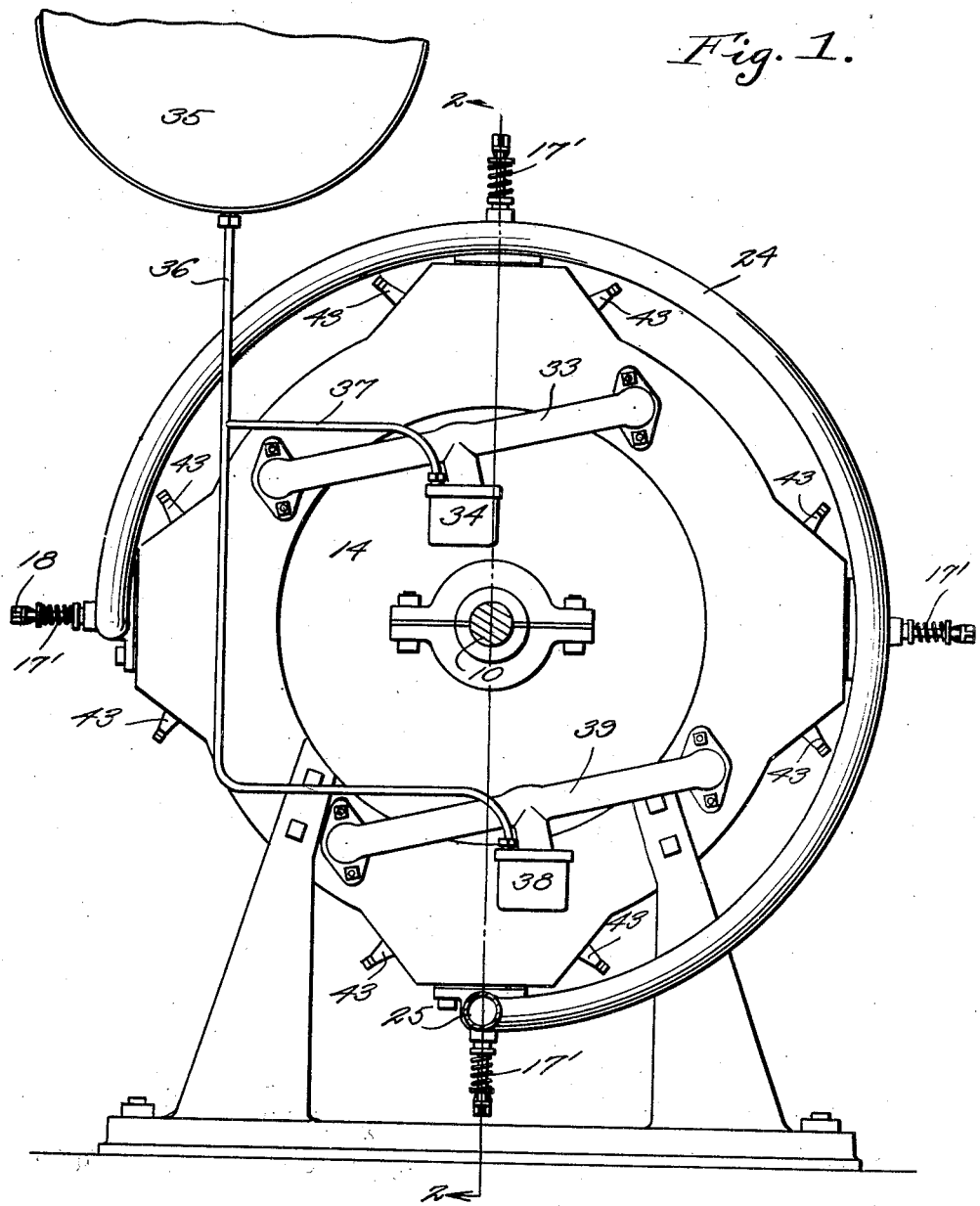

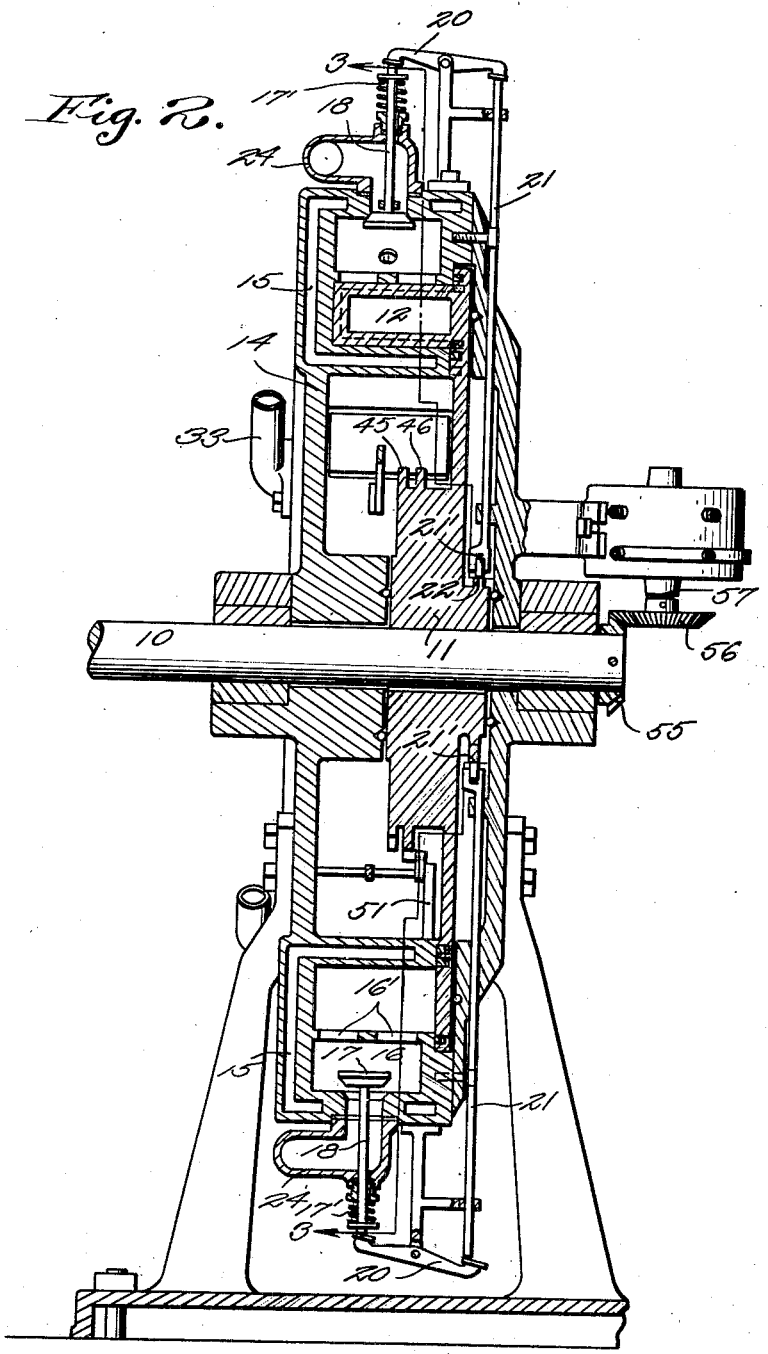

March 22, 1932.  R. H. ERNY  1,850,833
ROTARY INTERNAL COMBUSTION ENGINE
Filed Aug. 5, 1927  5 Sheets-Sheet 4

R. H. Erny
INVENTOR
BY Victor J. Evans
ATTORNEY

WITNESS:

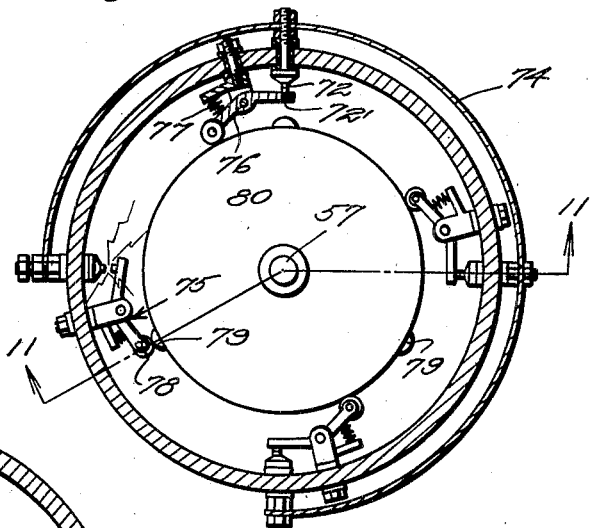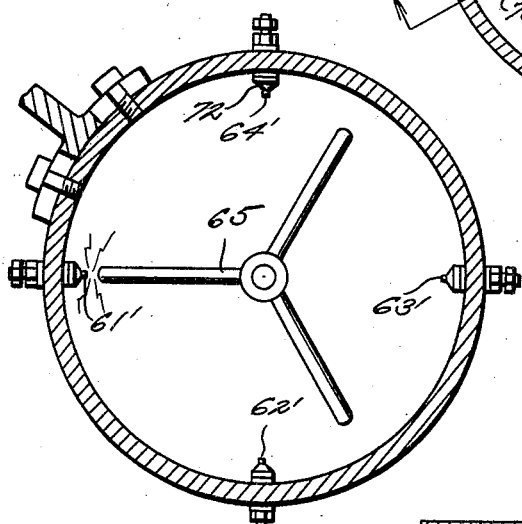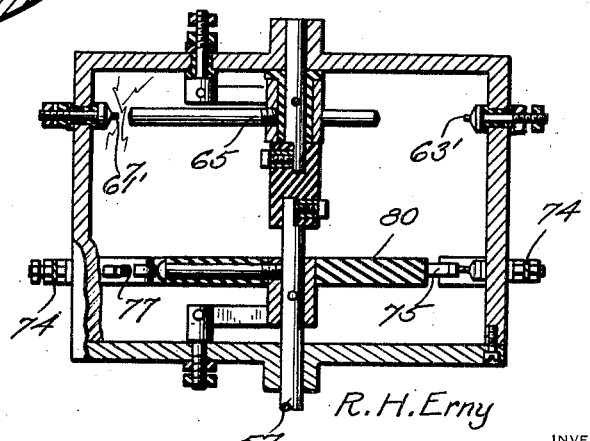

Patented Mar. 22, 1932

1,850,833

UNITED STATES PATENT OFFICE

RALPH H. ERNY, OF ZERO, MONTANA

ROTARY INTERNAL COMBUSTION ENGINE

Application filed August 5, 1927. Serial No. 210,984.

The object of this invention is to provide a rotary internal combustion engine employing a plurality of pistons carried by a disk keyed to the main shaft, these pistons travelling in an annular groove in a housing, and to provide a plurality of radially movable plates, controlling, in connection with the necessary valves, the admission, compression, firing, and exhaust of the fluid from segmental portions of the groove, or annular space, in which chambers are defined by the movement of the plates.

A further object is to control the movement of the plates by cams rigid with the disk and main shaft.

A further object is to make certain provision for firing the charge.

With the foregoing and other objects in view, the invention consists in the novel construction and arrangement of elements described, illustrated and claimed, it being understood that modifications may be made within the scope of the claim, without departing from the spirit of the invention.

In the drawings forming part of this application,

Figure 1 is a view of the engine in elevation, looking from the left in Figure 2.

Figure 2 is a view in vertical section, on line 2—2 of Figure 1.

Figure 3 is a view in vertical section, on line 3—3 of Figure 2.

Figure 4 is a detail view in perspective, showing one of the pistons, attached to a portion of the main disk.

Figure 9 is a section thru the circuit breaking device.

Figure 10 is a section thru the distributor, or contact devices to be connected with the spark plugs.

Figure 11 is a section on line 11—11 of Figure 9.

Figure 5:
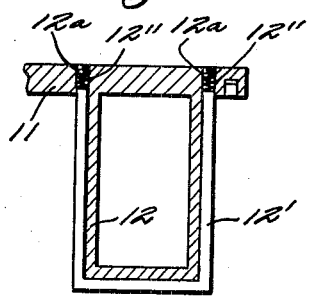
Figure 5 is a detail in section, of one of the pistons.

A main shaft 10 has keyed thereon a disk 11 mounting pistons 12, of the particular form illustrated in Figures 3 and 4, these pistons being adapted to travel in an annular space provided in the main motor casting or portion 14 of the housing. A water jacket in the housing is designated 15.

Combustion chambers 16 have connection with exhaust ports controlled by exhaust valves 17, and the stems 18 of the valves are operated by rocker arms 20 and push rods 21 controlled by a cam 22 carried by a disk 11.

The several exhaust ports controlled by valves 17 are connected by a duct 24, shown especially in Figure 1, and having an outlet at 25. The valves 17 are spring controlled in one direction, the springs being designated 17', and are positively controlled in the opposite direction, by cam 22 and the devices operated thereby.

The intake ports 31 and 32 are connected by a manifold 33, and the housing of carbureter 34 is in communication with manifold 33. Fuel tank 35 is connected by duct 36 and branch duct 37 with carbureter 34, and this duct 36 also communicates with carbureter 38, the latter having connection with manifold 39 leading to intake ports 41 and 42. Spark plugs 43 are positioned on opposite sides of combustion chambers 16.

Baffle plates B and compression plates C are movable in fixed guides, across the annular space in which the pistons travel, the direction of movement being radial with reference to the main shaft 10. These plates are controlled by cams 45 and 46 on disk 11, and are therefore controlled by shaft 10 on which the disk is keyed.

The plates B and C are connected by links 48 with rocker arms 49, mounted for angular movement with spindles 50 which extend in a direction parallel with main shaft 10, being mounted in stationary portions 14 of the main structure; the other ends of the spindles are mounted in posts 51. The short arms 53 on the spindles 50 and moving therewith, mount cam rollers 54, these rollers cooperating with the cam 45, or the cam 46, as the case may be.

The rocker arms 49 controlled by cams 45 and 46 rotating with main shaft 10 and disk 11 thereon, therefore control the movement of plates B and C in a radial direction, incident to the operation of the engine, as described below. The cam 22 on disk 11 cooperates with cam rollers 21' on the ends of push rods 21 operating the rocker arms 20 of exhaust valves 17.

Shaft 10 carries rigidly thereon a gear wheel 55 meshing with a gear wheel 56 on shaft 57 of the timing apparatus.

In Figure 4, a packing ring for the outer portion of disk 11, is shown at 11', and the pistons 12 are provided with external channels for the packing 12', as in Figures 4 and 5. The coiled springs 12'' exert pressure on packing 12', and may be adjusted by set screws 12a. Ports 16' are provided between the annular groove or annular space for the pistons and the combustion chambers 16. It will be observed that the pistons are hollow, and they may be cast directly on the disk 11.

There are three pistons and four combustion chambers. Each piston 12 draws in a charge of fuel for the piston following, and this charge, or mixture, is held there in the piston groove, or annular channel, by the baffle plate B, until the following piston starts to compress the mixture. Then the baffle B will open and the compression plate C will close, thus forming a space where the fuel will be forced into the combustion chamber 16 thru port 16'. The movement of the piston will close the port 16', at the proper time. The compression plate C will open, the baffle plate B closing, thereby holding the compressed fuel in the combustion chamber 16.

The charge is ignited by the spark-plug 43, just as the piston 12 starts to open the port 16' between the combustion chamber 16, and the annular channel or piston groove.

At this point, the compression plate C will start to open, allowing the gas unignited and not forced into the combustion chamber 16, but retained in front of the piston, to pass on and mix with the unignited gas or fuel drawn in by the preceding piston. The intake port will close by the succeeding piston 12, preventing the fuel from passing back into the intake manifold, and as piston 12 moves forward, the baffle plate B being closed, and the compression plate C being open, the exploding gas or fuel in the combustion chamber will exert pressure behind the piston 12, driving it forward.

As the piston passes beyond the combustion chamber, the compression plate will close directly behind the piston, and at the same time the exhaust port controlled by valve 17 will open, and the port will remain open until baffle plate B has opened approximately one-third of its stroke, thereby allowing fresh fuel to force the exhaust gases out. It will then close, and the compression is to be repeated.

Figure 8:
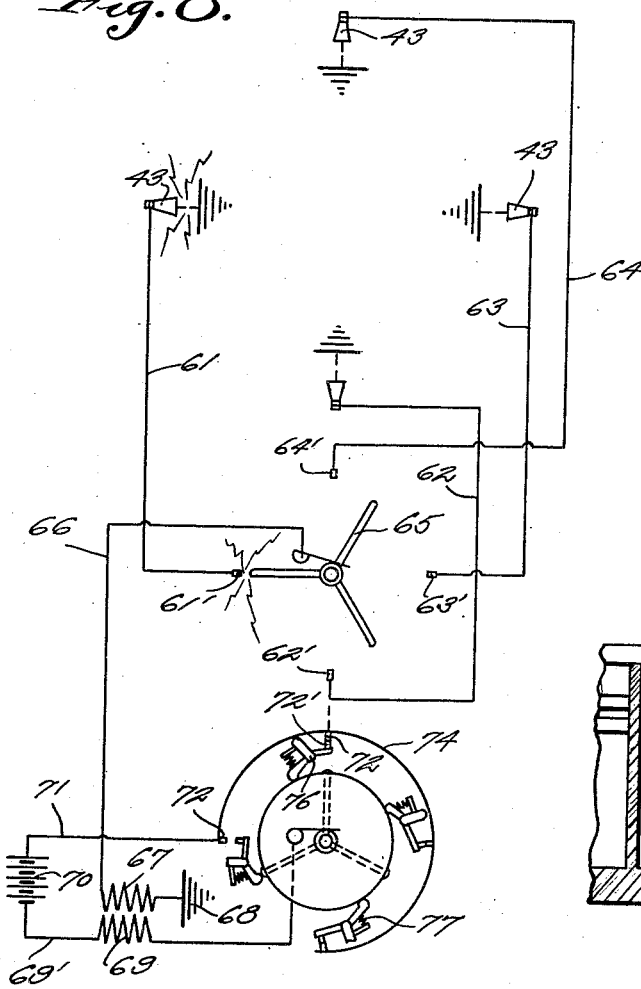
Figure 8 is a diagrammatic view of the circuits for the spark plugs and the controlling means therefor.
Figure 6:
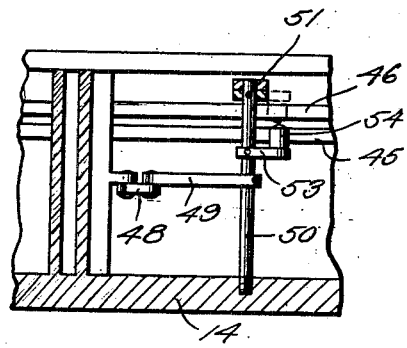
Figure 6 is a detail view in section showing the devices operated by the cams carried by the main disk.
Figure 7:
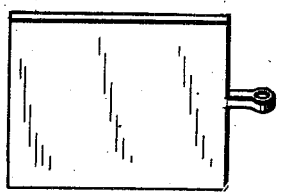
Figure 7 is a view in perspective showing one of the the plates controlled, or to be controlled, by one of the cams, and movable in a radial direction across the annular space between the pistons.

In Figure 8, the spark plugs 43 are connected by wires 61, 62, 63, 64, with contacts 61', 62', 63', 64' and a three-armed rotary current distributing device 65 mounted on and insulated from shaft 57 is in electrical connection thru wire 66 with secondary coil 67, grounded at 68, it being understood that the plugs 43 are grounded thru the engine.

Primary coil 69 is connected by wire 69', with battery 70, and the other terminal of the battery is connected by wire 71 with contact elements 72, all of which are in electrical connection by means of conductor 74.

Brushes 75 carry contacts 72' cooperating with contacts 72, and these brushes are pivoted at 76 and are controlled in part by springs 77. They carry contact rollers 78 operated by elements 79 on rotary member 80 carried by shaft 57. This provides a compact arrangement including an interrupter and current distributing device, for direct connection with the spark plugs.

Having described the invention, what is claimed is:—

In a rotary internal combustion engine, a casing, a shaft journalled in the casing, a rotor mounted upon the shaft within the casing, pistons of segmental form carried by the rotor and having concavely curved ends, a hollow annular stator within the casing concentric to the rotor, the stator having transverse slots, in its inner wall, baffle plates and compression plates radially slidably mounted in the slots, rocker arms mounted in the stator, a wheel rotatable with the shaft and concentric to the stator, cams upon the wheel, a roller upon one end of each rocker arm, a link connecting the other arm with a respective one of the plates, an annular intake manifold at one side of the casing, intake ports in the adjacent wall of the casing, branches extending from the intake manifold and communicating with the intake ports, an exhaust manifold, exhaust ports in the periphery of the casing, spring closed valves for controlling said ports, a member rotatable with the shaft, cams upon the member, radial rods mounted in the casing, rollers at the inner ends of the rods engageable by the cams to effect opening of the exhaust valves, tappet arms upon the periphery of the casing coacting with the valve stems, and the outer ends of the rods, spark plugs upon the casing, and a timer for the plugs.

In testimony whereof I affix my signature.

RALPH H. ERNY.